United States Patent
Shih

[19]

[11] Patent Number: 5,964,327
[45] Date of Patent: Oct. 12, 1999

[54] ACTIVE CONTROL APPARATUS AND METHOD FOR VIBRATION REDUCTION

[75] Inventor: Ming-Hsiang Shih, Taipei, Taiwan

[73] Assignee: Hawse Company Limited, Taipei, Taiwan

[21] Appl. No.: 08/916,951

[22] Filed: Aug. 25, 1997

[30] Foreign Application Priority Data

Oct. 14, 1996 [TW] Taiwan .................................. 85112505

[51] Int. Cl.[6] ........................................................ F16F 7/10
[52] U.S. Cl. ............................................. 188/380; 248/562
[58] Field of Search .................................... 188/380, 379, 188/129, 67; 267/136, 150; 248/562, 636, 578, 568, 569

[56] References Cited

U.S. PATENT DOCUMENTS

| | | | |
|---|---|---|---|
| 3,382,955 | 5/1968 | Deyerling | 188/129 |
| 4,030,579 | 6/1977 | Sell | 188/67 X |
| 4,385,665 | 5/1983 | Knoll | 188/379 X |
| 4,586,425 | 5/1986 | Redman et al. | 188/67 X |
| 4,589,301 | 5/1986 | Griner | 188/67 X |
| 4,650,167 | 3/1987 | Steiner et al. | 188/380 X |
| 4,674,725 | 6/1987 | Popper | 248/562 |
| 5,197,573 | 3/1993 | De La Fuente et al. | 188/67 |

*Primary Examiner*—Robert J. Oberleitner
*Assistant Examiner*—Pamela J. Lipka
*Attorney, Agent, or Firm*—Bacon & Thomas, PLLC

[57] ABSTRACT

Apparatus for reducing a vibration that is propagated from outside a structure involves using a stiffener having a support point and a base point situated a distance from the support point to absorb the vibration. When an outside vibration is propagated to the structure, elastic strains occur both in the structure and in the stiffener, and the support point moves relative to the base point. The vibration reduction apparatus monitors the relative velocity of the support point relative to the base point, and when the monitored relative velocity changes its direction, releases a coupling between the support point of the stiffener and the structure, resulting in quick release of potential energy induced by the elastic strain stored in the stiffener and zeroing of the relative velocity between the support point and the base point. The support point of the stiffener is immediately re-coupled to the main structure upon zeroing of the relative velocity, and the relative velocity continues to be monitored until it either becomes zero or again changes direction, at which time the coupling and recoupling is repeated.

8 Claims, 7 Drawing Sheets

ACTIVE CONTROL APPARATUS AND METHOD FOR VIBRATION REDUCTION

BACKGROUND OF THE INVENTION

A slender structure is very sensitive to dynamic loading. A high building, long span bridge, skyscraper and other similar structures may lose their function or in some serious cases may be destroyed under dynamic loading. In general, the kind of damage induced by the dynamic loading can be divided into two kinds, namely functional and safety loss.

In order to solve this kind of problem, it is conventional to increase the strength and ductility of load bearing structures. This is the usual practice in earthquake-resistance design for civil works. Another method is to employ some measure to reduce the response of the structure to such vibration.

The methods of reducing vibration of the structure generally can be divided into two classes, namely passive control and active control. The so-called passive control is usually carried out by increasing or decreasing a number of springs in the structure to change the stiffness of the structure, so that its natural frequency can be adjusted to depart from the frequency of dynamic loading.

Alternatively, a mass-spring damper may be installed on the structure to concentrate vibration energy in the mass-spring damper, so that the goal of reducing the vibration of main structure can be reached.

Another method is to arrange weak spots at some specific positions on the structure. In this way, strong vibrations will force these weak spots to produce plastic strains, by which energy consumption of the total structure can be increased. A common point of the passive control is that the dynamic characteristics of the structure are fixed after completing the structure, and the stress status of struts in the structure is completely determined by the time history of the loading. It is not necessary or even possible to take initiative action to change the characteristics. Therefore the designer must grasp in advance the complete characteristics of dynamic loading, such as magnitude and spectrum, so that an effect of the vibration reduction by these methods can be assured.

The so-called active control generally means installing a mechanism, such as an oil or air pressure mechanism, which can give additive force to the structure or change the status of inner forces in a part of the struts in the structure. Though theoretically the active control method can achieve a very good effect, it has a problem of stability in actual application, and also a large amount of energy has to be supplied. Furthermore, the mechanism itself is unreliable. Its range of applications, and especially applications for reducing the vibration of civil engineering and construction under dynamic loading, are much less than passive control cases.

As mentioned above passive control has the fault that its effect is poor, and active control has the faults that it is unreliable and requires a large amount of energy.

SUMMARY OF THE INVENTION

The present invention provides a method of reducing the vibration that is propagated from outside a structure by absorbing it largely through a stiffener of the structure, wherein the stiffener has a support point and a base point located a distance from the support point, and is coupled to the structure at the support point and the base point. When an outside vibration is propagated to the structure, elastic strains will occur both in the structure and the stiffener, and the support point will move relative to said base point. The method of the invention includes the following steps: a) A relative velocity of the support point with respect to the base point is monitored; b) When the relative velocity monitored in step a) changes its direction, coupling at c) The support point between the stiffener and the structure is released so that a potential energy induced by the elastic strain of the stiffener is quickly related and stored again in the stiffener, in order to cause the relative velocity of the support point and the base point to become zero. The support point of the stiffener on main structure is then immediately coupled at the position where the velocity of said relative motion becomes zero or just changes its direction; and d) steps b) and c) are repeated whenever the relative velocity of the support point to the base point changes. In step b) of the present invention, "When the relative velocity monitored in step a) changes its direction" in a broad sense refers to a small period of time before and after that moment when the relative velocity changes its direction. The typical example of this small period of time is the small periods of time around point "a" shown in FIG. 8 where the slope is about zero.

Moreover, the present invention provides a translation type active control apparatus for vibration reduction applicable to the above-mentioned method, which includes a housing; a slide rod, which is slidably received in the housing with its both ends protruding from two edges the housing; a piston having two ends, which is fixedly installed in the housing at one side of the slide rod, and can be driven to extend either end thereof toward one end of the slide rod; two brakes, which are disposed in the housing at the two ends of the piston; two springs, which are disposed in the housing and at one side of said housing opposite to the slide rod. When the piston is not driven, the two springs will push the two brakes against two ends of the piston to permit the two brakes to contact with the slide rod and the two slant faces at the same time, so that the slide rod is locked by the two brakes and cannot slide in a direction toward any edges of the housing. When the piston is driven and one end of the piston extends in a direction toward one end of the slide rod and one edge of the housing, one of the brakes will be pushed so that the pushed brake is not able to contact with the slide rod and one of the two slant faces at the same time, and thus allow the rod to slide in a direction toward another edge of said housing.

A preferred translation type active control apparatus for vibration reduction further includes another piston having two ends, the second piston being fixedly installed in the housing at another side of the slide rod, and this another piston is driven synchronously with the first piston to extend either end thereof toward one end of the slide rod; another two brakes, which are disposed in said housing at said two ends of said another piston; another two springs, which are disposed in the housing; and another two slant faces formed inside the housing. The second piston, the additional two brakes, the additional two springs and the additional slant faces are mirror symmetrical with the piston, the two brakes, the two springs and the two slant faces with respect to the slide rod.

In the translation type active control apparatus for vibration reduction of the present invention, cylindrical rods, round balls or wedge-shaped blocks may be used as the brakes.

The present invention also provides a rotation type active control apparatus for vibration reduction applicable to the method of the present invention, which includes a revolving axle and a pair of free wheels, each of the pair of free wheels having an outer ring, an inner ring, a brake mechanism positioned between ring surfaces of the outer ring and the inner ring, and a piston means. The brake mechanism allows the inner ring to be locked only in one direction with respect to the outer ring, and to rotate in another direction. The piston means can be actuated to drive the brake mechanism to release the locked direction of the inner ring with respect to the outer ring so that the inner ring is able to rotate in both of the two directions with respect to the outer ring. The inner rings of the pair of free wheels are non-rotatably coupled respectively with two ends of the revolving axle, so that the revolving axle is locked in one direction by one of the pair of free wheels and is locked in another direction by another one of the pair of free wheels. In this way, when the piston means in one of the pair of free wheels is actuated and drives the brake mechanism, the revolving axle and the inner rings of the pair of free wheels will rotate together in one direction with respect to the outer rings of the pair of free wheels, but the other direction will be still locked by the outer wheel of the pair of free wheels.

| 1 | Square housing | 2 | Slide rid |
|---|---|---|---|
| 3, 4, 5, 6 | Brake round rod | 13, 14, 15, 16 | Slant face |

-continued

| 7, 8 | Oil pressure cylinder | 9, 10, 11, 12 | Compression spring |
|---|---|---|---|
| 21, 22 | Free wheel | 30 | Revolving axle |
| 23, 24 | Inner ring | 25, 26 | outer ring |
| 27, 28 | Round rod | | |

DETAILED DESCRIPTION OF THE PREFERRED EMBODIMENTS

The present invention is an active control apparatus for vibration reduction, in which a side-directed stiffener, such as a shear wall, racing strut, or pre-stressed steel tendon, etc., generally used in building and civil structures, or a spring in machinery, is combined for practical application, in order to obtain excellent efficiency in vibration reduction. When a structure is strained under loading, a stiffener or spring connected with the main structure will produce an internal force accompanying the strain, but the internal force is changed actively and within a limited range by an active control apparatus. The active and limited change expressed above means that the direction of the internal force can be changed at any time to meet the demand, but will not be changed to an arbitrary value. So long as this internal force maintains its direction opposite to the motion of the structure, a good effect of energy consumption can be obtained, and hence the goal of vibration reduction can be accomplished.

The work to changed the direction of internal force mentioned above can be accomplished merely through releasing a stiffener by the active control apparatus of the present invention to separate it from a main structure. Though the requirements of release and re-clip can be met by a conventional clip or clutch, it cannot timely change the direction of internal force, because a stiffener usually has a very high frequency of free vibration. The work of re-clip is almost impossible to be timely done by mechanical action. When the active control apparatus of the present invention releases a stiffener, it does not make complete separation from the main structure, but only allows it to produce relative displacement or rotation in one chosen direction. The relative motion in the opposite direction is still restricted. Therefore, the re-clip operation will be automatically practiced at the correct time, and change of the direction of internal force thus can be reached.

There are two kinds of active control apparatus for vibration reducing according to preferred embodiments of the present invention, which are:

Translation type active control apparatus for vibration reduction; and

Rotation type active control apparatus for vibration reduction.

The structures main components and functions of these two kinds of active control apparatus are explained below.

1. Translation type active control apparatus for vibration reduction (Refer to FIGS. 1 and 2)

Figure 1:
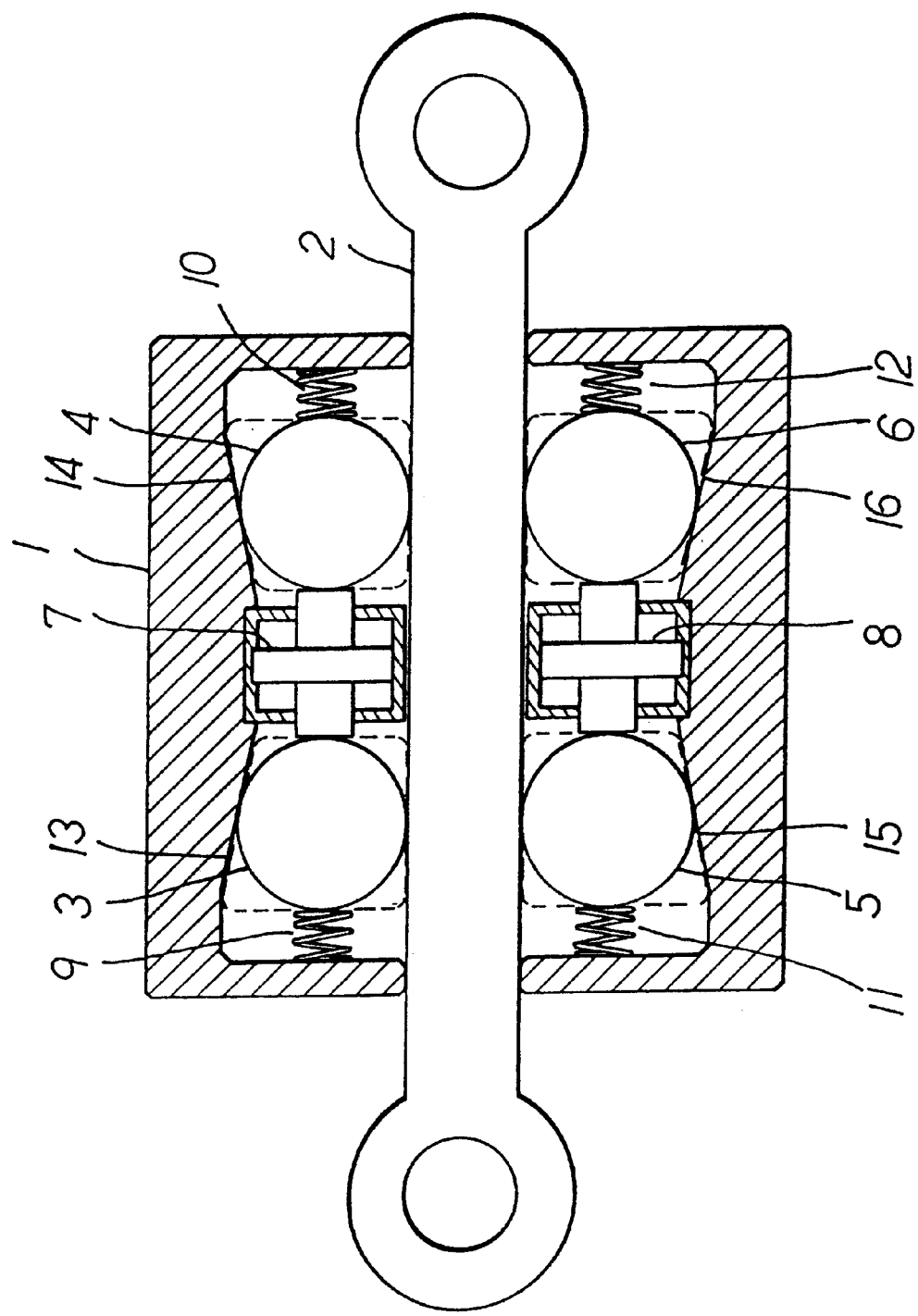
FIG. 1 shows a horizontal sectional view of a translation type active control apparatus for vibration reduction which is constructed according to a first preferred embodiment of the present invention.
Figure 2:
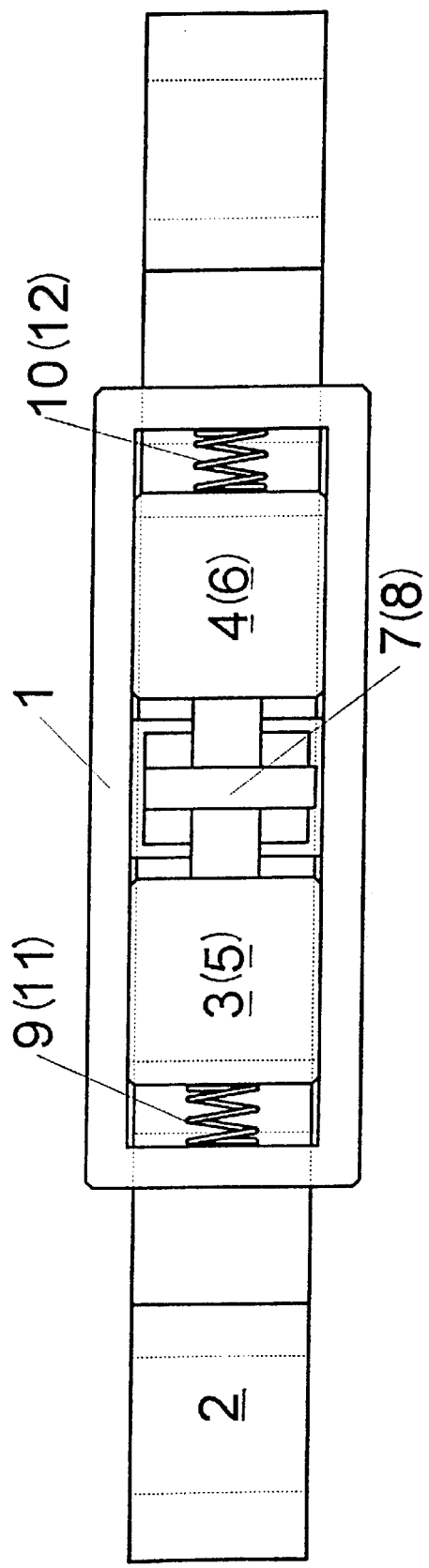
FIG. 2 shows a vertical sectional view of the active control apparatus shown in FIG. 1.

The horizontal sectional view of the structure of a translation type active apparatus for vibration reduction is shown in FIG. 1, and its vertical sectional view is shown in FIG. 2. By using this apparatus, the relative translation between a stiffener and a main structure (not shown in the figures) can be stopped, and its restriction can be released selectively in one direction, while keeping the restriction state in the opposite direction.

A fixed connection method is employed to connect one end of the stiffener with a main structure, and another end of the stiffener is connected with the main structure through the active control apparatus. In installation, a square housing 1 of the apparatus is fixed on the main structure, and the stiffener is at the same time fixed to round holes on both ends of a slide rod 2 using U-shaped parts.

When the side rod 2 cannot move freely, relative displacement between the main structure and the stiffener will not be able to change, and therefore a strain of the stiffener will change following a strain of the main structure. When it is desired to let the housing 1 of the apparatus catch the slide rod 2, round brake rods 3, 4, 5, 6 may be employed in cooperation with slant faces 13–16.

The angle between slant faces 13, 14, 15, 16 in the housing 1 and the slide rod 2 should be matched with the coefficient of sliding friction therebetween by letting the value of a tangent function of half of this angle be smaller than the coefficient of sliding friction. So long as the above-mentioned condition is satisfied, the brake rods 3, 5 and slant surfaces 13, 15 can constitute a rigid connector which bears a directional property. It can prevent the slide rod 2 from producing a displacement in the rightward direction relative to the housing 1 (as shown in FIG. 1), but does not have a restriction action to a relative displacement in the leftward direction. Also, another rigid connector is constituted by the brake rods 4, 6 and slant faces 14, 16. It can prevent the slide rod 2 from displacement to the left relative to the housing 1, but does not have a restriction action to a relative displacement of the right direction. Therefore, the apparatus shown in FIGS. 1 and 2 restricts the slide rod 2 to move in both left and right directions.

When another end (the top end) of the stiffener has bent to the left by the main structure and is restricted by the active apparatus from moving to the right, the oil pressure cylinders 7, 8 are actuated to simultaneously push the brake rods 3 and 5 to the left and release the restrictions on the movement of the top end of the stiffener in the rightward direction. After the brake rods 3 and 5 are separated from their contact positions, the slide rod 2, when acted by a right directional force, will start to move to the right immediately. As the stiffener is an elastic body, the top end of the stiffener together with the slide rod 2 will start to move to the left after a half period of vibration (maximum amplitude) has passed. However the movement to the left of the slide rod 2 is stopped by the brake rods 4 and 6, and thus the stiffener will still move together with the control apparatus and the main structure. In the opposite way, the slide rod 2 is permitted to move to the left but not to the right upon actuation of the oil pressure cylinders 7 and 8 to simultaneously push the brake rods 4 and 6 to the right. For securing the contact between the brake rods 3, 4, 5, 6 and slant faces 13, 14, 15, 16 inside the housing of the apparatus, compression springs 9, 10, 11, 12 are disposed in the housing and between the brake rods 3, 4, 5, 6 and the two edges of the housing, respectively.

From the above description, it can be clearly inferred that the brake rods 3–6 shown in FIG. 1 can be replaced by wedge-shaped blocks (as shown in FIG. 1 by dotted line) in obtaining the same functions. Furthermore, if brake rods 3–6 are round balls, the control apparatus shown in FIGS. 1 and 2 can still work.

2. Rotation type active control apparatus for vibration reduction (Refer to FIGS. 3 and 4).

Figure 4:
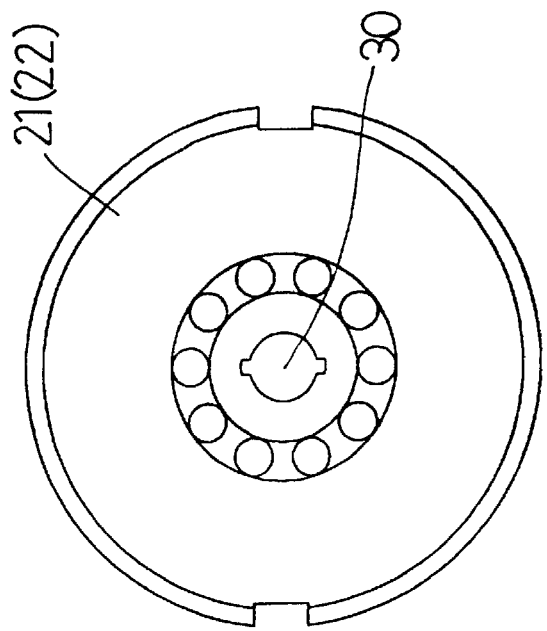
FIG. 4 shows a vertical sectional view of the active control apparatus shown in FIG. 3.
Figure 3:
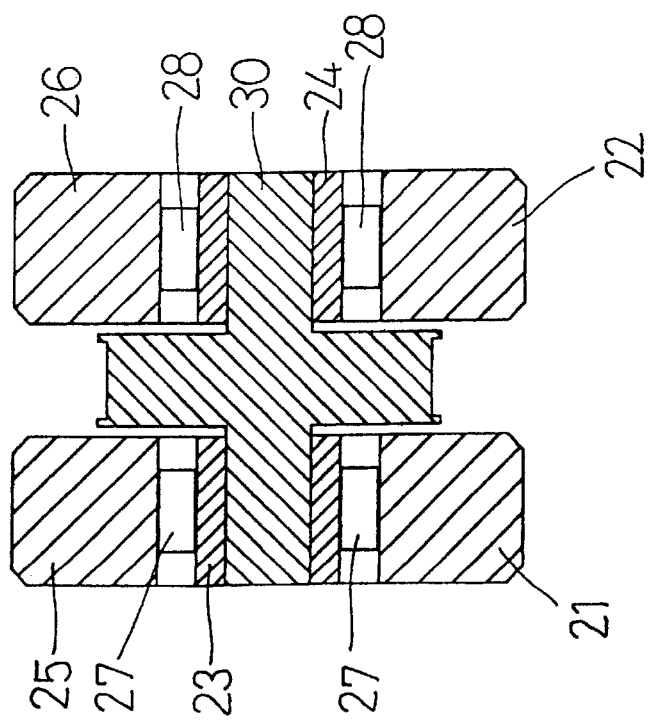
FIG. 3 shows a horizontal sectional view of a rotation type active control apparatus for vibration reduction which is constructed according to a second preferred embodiment of the present invention.

The vertical sectional view of the structure of a rotation type active apparatus for vibration reduction is shown in FIG. 3, and its side view in FIG. 4. By using this apparatus, the relative rotation between the stiffener (not shown in FIGS. 3–4) and the main structure (not shown in FIGS. 3–4) can be stopped, and its restriction can be released selectively in one direction, while keeping a restriction state in the opposite direction.

This apparatus is composed of two butt jointed releasable type free wheels 21, 22 and a common revolving axle 30. The free wheels are commercially available, such as those made by Stieber Antriebselements GmbH, Germany, model ETK. The revolving axle 30 and inner rings 23, 24 of the two free wheels 21, 22 are connected non-rotatably. They are forced to make a complete closed coupling, and these three parts (revolving axle 30, two inner rings 23, 24) must rotate together. The two free wheels 21, 22 include a plurality of slant faces on ring surfaces of outer rings 25, 26 or inner rings 23, 24; a plurality of round rods 27, 28 restricted between surfaces of the outer rings and the inner rings; a plurality of springs (not shown in the drawings) which cause the plurality of round rods 27, 28 and the plurality of slant faces to make contact; and a round ring having tooth-shaped projections (not shown in the figure) which are able to be driven by an oil pressure cylinder (not shown) in the drawings) to push apart the plurality of round rods 27, 28 from the many slant faces. The free wheels 21, 22 act as a rigid connector for the revolving axle 30, each of which restricts the rotation of the revolving axle 30 in one direction. As the free wheels 21 and 22 are under abutting coupling, the revolving axle 30 cannot rotate in any direction, unless both free wheels are released. For any one of the free wheels 21, 22, the round rods 27 (28), which are used by the free wheel to restrict relative rotation between the inner ring 23 (24) and outer ring 25 (26), can be pushed apart from their contact positions by the round ring having tooth-form projections if it is driven by the oil pressure cylinder. As a result, its restriction in one direction is released, so that the free wheel does not have any braking functions, and become a rolling bearing.

Consequently, after the restriction of the free wheel 21 is released by the oil pressure cylinder, the revolving axle 30 becomes freely rotatable in the direction in which it was originally restricted by the free wheel 21, but still cannot rotate in the opposite direction which is restricted by the free wheel 22. Conversely, after the restriction of the free wheel 22 is released by the oil pressure cylinder, the revolving axle 30 becomes freely rotatable in the direction in which it was originally restricted by the freewheel 22, but still cannot rotate in the direction which is restricted by the free wheel 21.

When the free wheel 21 or 22 is released, restriction suddenly disappears, and not in a gradually decreasing way, so that there is no friction phenomenon.

This characteristic is very important in applying this apparatus to an active control mechanism for vibration reduction, because it can avoid energy loss.

In installation, the outer rings 25, 26 are fixed on a top surface of a main structure, and two ends of the stiffener are connected to two different positions on a bottom surface of the main structure while fixing a middle point of the stiffener on the revolving axle 30.

The method of practicing the active control apparatus of the present invention is explained below.

In case of a civil structure or mechanical structure under dynamic loading (such as wind force, earthquake force, high speed vehicle, and eccentric reciprocating force of a motor in machinery), its dynamic responses (displacement, velocity, acceleration) are generally larger than static response under static loading, resulting in an increase of stress (the ratio of force received to area acted by the force) of the stiffener in the structure, and in extreme cases, the stress may exceed the limit that it can endure. Even when there is no safety problem, when too large an amplitude of vibration received, users may feel unpleasant or anxious, and the functions of the structure can be affected.

The countermeasure generally taken by designers is to add a stiffener (such as a shear wall and a bracing strut between two floors of an architecture structure, or deepened main beam in a bridge structure) to the place where stiffness is relatively small. The stiffness is a degree of hardness. Academically it is defined as a magnitude of the force or the twisting force which is needed to make a unit of deformation. In structural dynamics, it is well known that these elastic stiffeners do not increase damping force effect. The damping force is the force which direction is opposite to motion, so that it will prevent or obstruct the motion of an object. This is the reason why it is so named. The application of the active control apparatus of the present invention can make it easy to change the direction of the force acted by a stiffener on a main structure at the proper time. Therefore, it is possible to cause the action of a stiffener on a main structure to maintain an opposite direction to the motion of a structure, and thus a damping effect is very effectively increased.

In the whole control system for vibration reduction, besides the active control apparatus and a stiffener, it is necessary to use a computer to monitor the direction (plus or minus) of relative velocity between positions to which a main structure receives a stiffener (a base point where the stiffener is fixed to the main structure and a support point where the stiffener is connected to the main structure through the active control apparatus), and to transmit obtained data to a computer at any time. The computer is able to output an output signal which has a frequency higher than a vibration frequency of said structure. As soon as the computer monitors a change of a sign of the relative velocity (that is to say, the relative velocity has been zero immediately just before), it transmits a signal to an electric valve of an oil pressure cylinder in the active control apparatus. The active control apparatus then releases restriction in a proper direction, letting the force acted by the stiffener on the main structure turn its direction.

Note: During almost the whole time, the active control apparatus provides restriction on both directions, and only at the instant when the velocity changes its direction, it releases restriction on one direction. The direction to be released is alternated.

EXAMPLES

Figure 7:
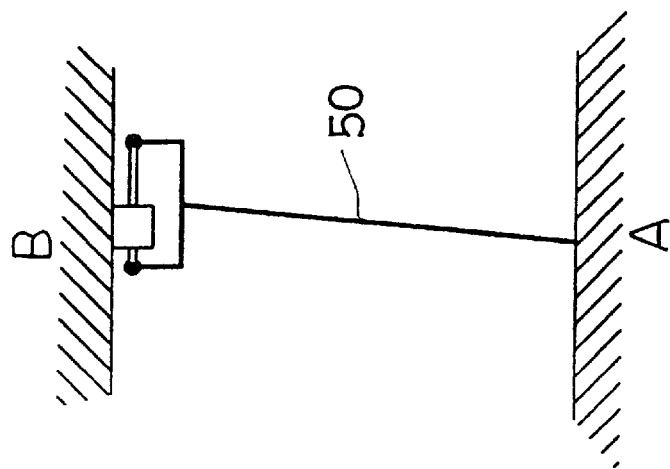
FIG. 7 shows the case that, when oil pressure cylinders 7 and 8 of the control apparatus shown in FIG. 6 are actuated to simultaneously push out the brake rods 3 and 5, the slide rod 2 and the top of stiffener 50 move to the right until the stiffener actually restores potential energy of its original maximum strain, and are restrained by the brake rods 4 and 6 so that they can not move to the left.
Figure 6:
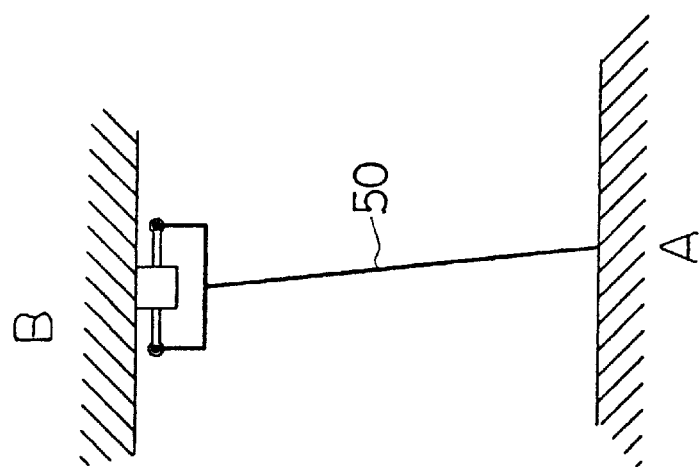
FIG. 6 shows the case that stiffener 50 reaches its maximum strain, when slab A shown in FIG. 5 stops its displacement.
Figure 5:
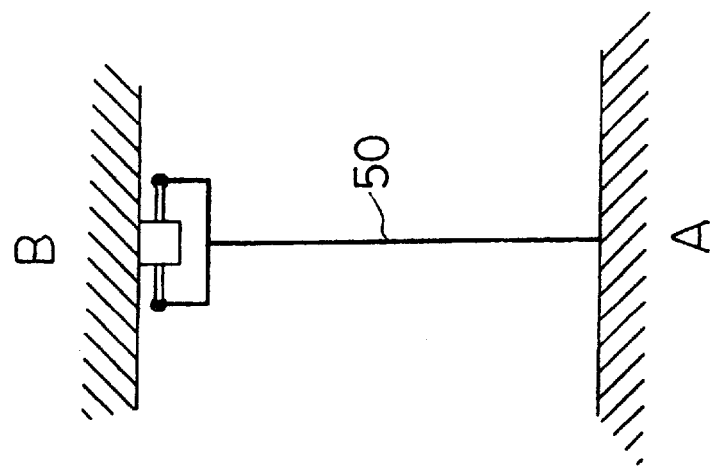
FIG. 5 shows a system which is provided with the translation type active control apparatus for vibration reduction shown in FIG. 1 in the case that it has not been affected by outside vibration yet.
Figure 8:
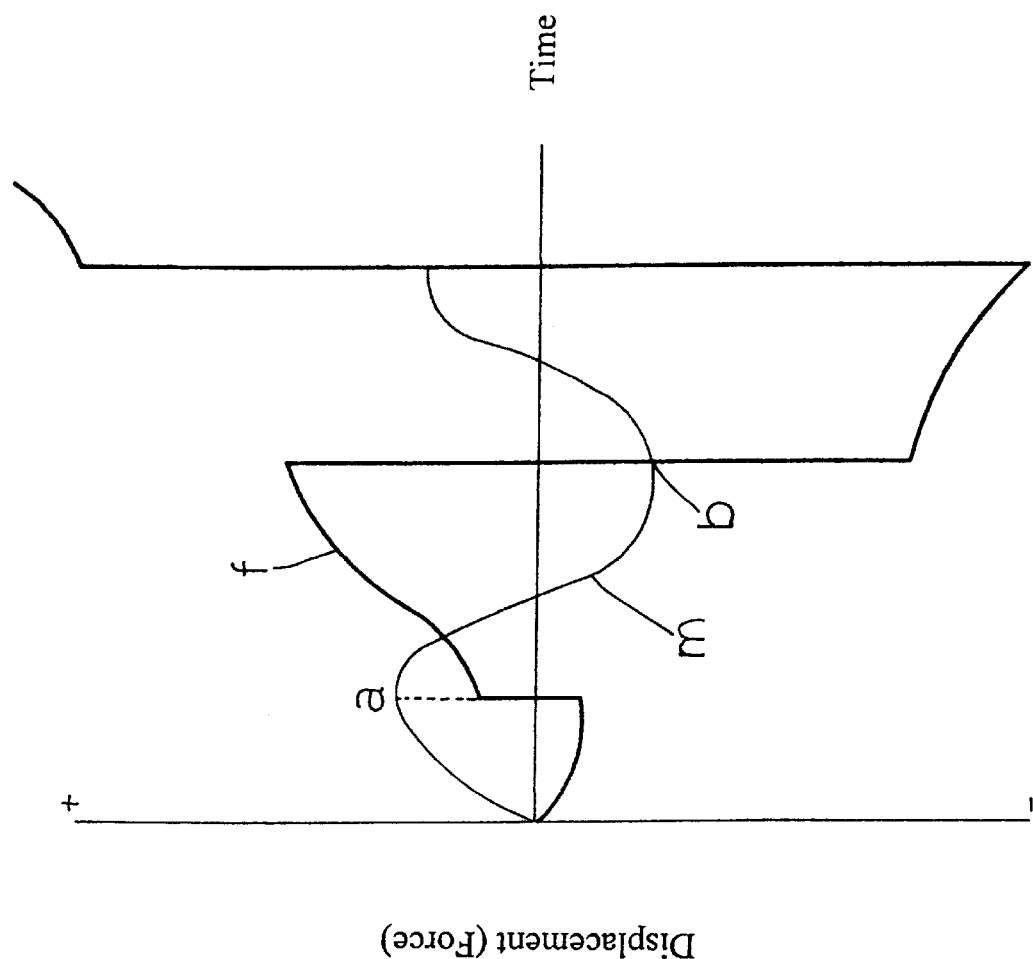
FIG. 8 shows the displacement of a slab B and the time history of internal force of stiffener 50, wherein curve "m" expresses the displacement of the slab B, curve "f" expresses the internal force of stiffener 50, the axis of abscissa expresses time, and the axis of ordinate expresses the displacement of slab B or magnitude and direction of the internal force of stiffener 50.

An apparatus shown in FIG. 5 is a translation type active control apparatus for vibration reduction using the embodiment shown in FIGS. 1 and 2, wherein the stiffener 50 is provided between slabs A and B. Its bottom end is fixed on the slab A, and its top end is connected to both ends of the slide rod 2 of the translation type active control apparatus for vibration reduction. A top surface of the housing 1 of the translation type active control apparatus for vibration reduction is fixed on the slab B. If the slab B is suddenly displaced a section of distance to the left relative to the slab A, then the slab B will make displacement at this moment together with the active control apparatus to the left, which will produce a relative velocity of the top end of the stiffener 50 relative to its bottom end. When the slab B stops its displacement relative to the slab A, the stiffener 50 reaches the maximum strain at this moment, and its top end starts to move to the right relative to its bottom end, as shown in FIG. 6. If the oil pressure cylinders 7 and 8 are actuated at this moment, and simultaneously push brake rods 3 and 5 to the left, the slide rod 2 and the top end of the stiffener 50 will then move to the right together till the stiffener substantially restores the potential energy of its original maximum strain, and be restricted on making the movement to the left again by the brake rods 4 and 6, as shown in FIG. 7. Nevertheless, the slab B will still continue the movement to right direction at this moment, which will produce more strain in the stiffener 50 until the whole dynamic energy of the slab B is converted to potential energy. Thus a half period of the vibration is produced by the slab B when it receives an outside vibration. Then another half period of the vibration in the opposite direction begins, and the slab B starts moving to the left relative to the slab A. At this moment, the brake rods 4 and 6 are pushed to the right, the slide rod 2 together with the top end of the stiffener 50 will move to the left till the stiffener restores potential energy, and then will be locked automatically by the brake rods 3 and 5. The slab B continues to move to the left relative to the slab A, so that more strain will be produced in the stiffener 50. As the cycle goes on, the stiffener 5 will continuously absorb the energy produced by vibration until a plastic strain is produced. The above procedures can be simply explained by FIG. 8, wherein the ordinate axis expresses time, the abscissa expresses the displacement of the slab B relative to the slab A or the horizontal force exerted by the stiffener on the slab B, curve "m" expresses the displacement of the slab b relative to the slab A, and curve "f" expresses the force on the stiffener 50. Point "a" expresses the situations of FIGS. 6 and 7, in which the brake rods 3 and 5 are pushed to the left, the slide rod 2 moves to the right, and then is locked automatically by the brake rods 4 and 6. As a result, the inner force of the stiffener 50 changes its direction and continuously increases. The point "b" in FIG. 8 is a start of the next half period. The brake rods 4 and 6 are pushed at this moment. The slide rod 2 moves to the left, and then is locked automatically by the brake rods 3 and 5 again. It again creates the result that the inner force of the stiffener 50 changes its direction and continuously increases.

Figure 9:
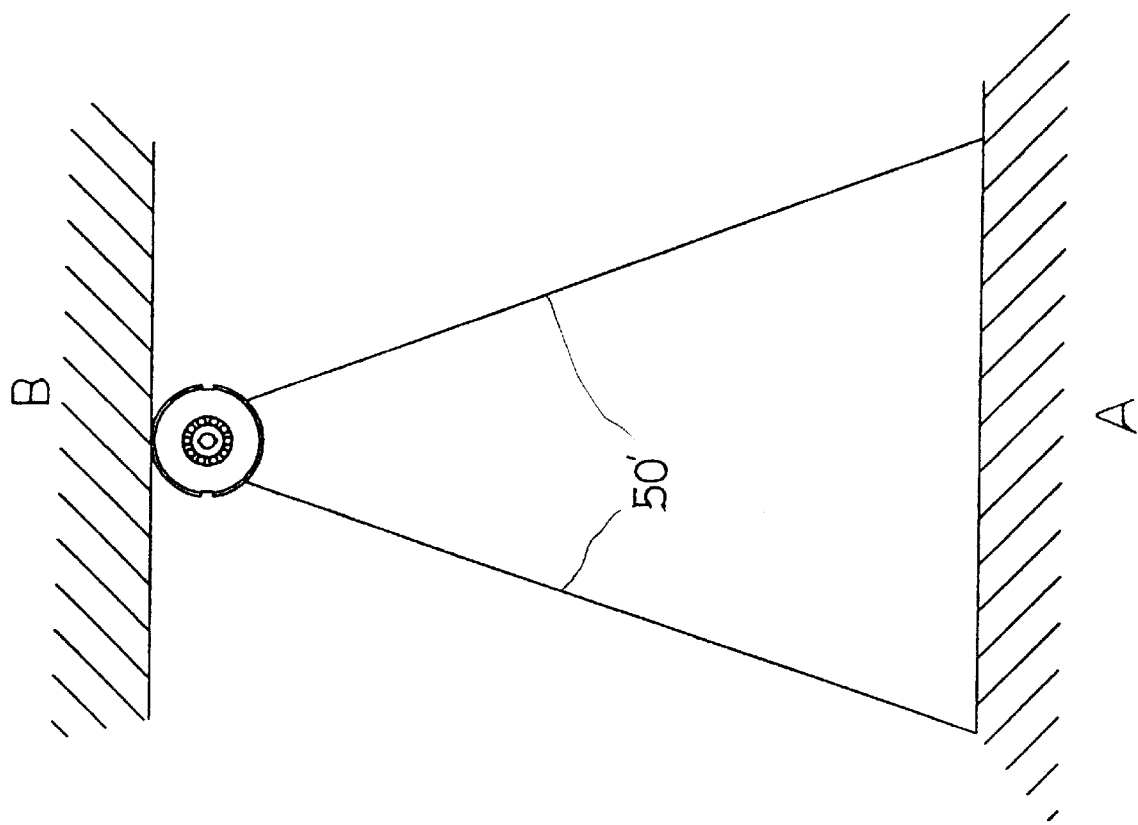
FIG. 9 shows the case that a rotation type active control apparatus for vibration reduction shown in FIG. 3 is applied in stiffener 50 between slab A and slab B.

FIG. 9 shows the situation that the rotation type active control apparatus for vibration reduction shown in FIG. 3 and FIG. 4 is used in the stiffener 50' between the slabs A and B. Its working principle is similar to that explained for FIG. 5 and FIG. 8.

Figure 10:
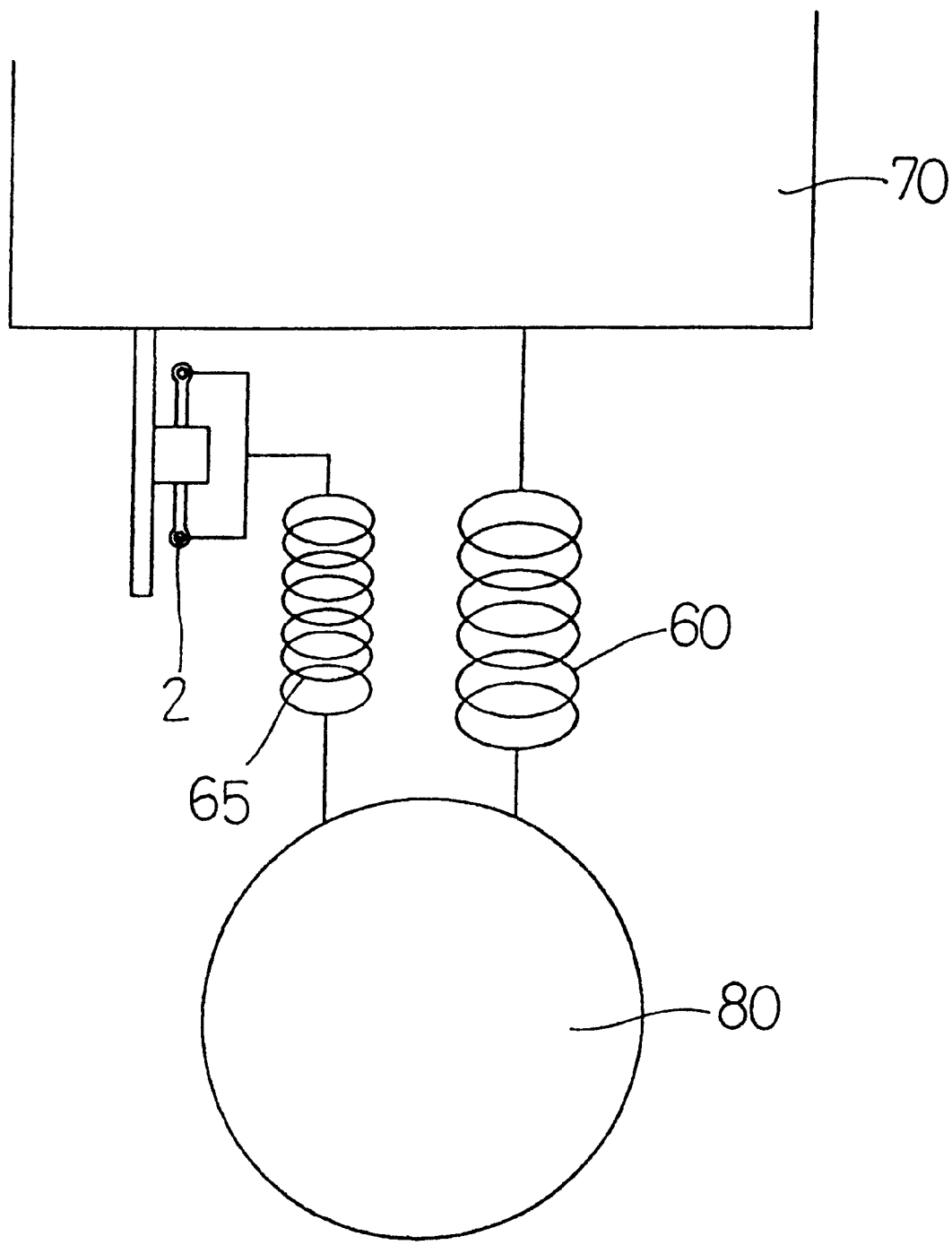
FIG. 10 shows the case that a translation type active control apparatus for vibration reduction shown in FIG. 1 is applied to a vibration absorption system of a vehicle.

FIG. 10 shows the situation where the translation type active control apparatus for vibration reduction shown in FIG. 1 and FIG. 2 is used for reducing vibration of a vehicle, wherein a car body 70 is supported on a wheel axle 80 through a spring 60; one end of a stiffener (spring) 65 is fixed on the wheel axle 80, and another end is connected to the both ends of the slide rod 2 of the control apparatus. If suddenly the car body 70 heavily presses the wheel axle 80 down a section of distance and then starts to recoil up, the slide rod 2 of the control apparatus will be released at this moment from the upward restriction that it has received. The slide rod 2 together with the top end of the stiffener 65 will immediately move upward and then is automatically locked. As the car body 70 still continues recoiling upward, the stiffener 65 will be continuously elongated until the whole dynamic energy is converted to potential energy. When the car body 70 starts to press down, the slide rod 2 of the control apparatus will be released from the downward restriction, and the slide rod 2 together with the top end of the stiffener 65 will immediately move downward together and then is automatically locked. As the car body 70 still continues pressing down, the stiffener 65 will be continuously compressed until the whole dynamic energy of the car body 70 is converted to potential energy. As the cycle goes on, the energy coming from a sudden press down of the car body 70 on the spring 60 will be largely absorbed by the stiffener 65, and vibration reduction will be reached.

It is apparent that the method of the present invention is able to be applied to any machinery having a vibration problem.

I claim:

1. A translation type active control apparatus for vibration reduction, comprising:

a housing having two edges;

a slide rod having two ends, which is slidably received in said housing with its both ends protruding from two edges of said housing;

a piston having two ends, which is fixedly installed in said housing at one side of said slide rod, and is arranged to be driven to extend either end thereof toward one end of said slide rod;

two brakes disposed in said housing at said two ends of said piston;

two springs disposed in said housing and biased between said two edges of said housing and said two brakes; and two slant faces formed inside said housing and at one side of the housing opposite to said slide rod;

wherein, when said piston is not driven, said two springs push said two brakes against said two ends of said piston and cause said two brakes to contact with said slide rod and said two slant faces at the same time, so that said slide rod is locked by said two brakes against sliding in a direction toward either of said two edges of said housing; and when said piston is driven and one end of said piston extends in a direction toward one of said ends of said slide rod and one of said two edges of said housing, one of said two brakes is pushed so that said one of said brakes is not able to contact said slide rod and one of said two slant faces at the same time, and said slide rod thereby being free to slide in a direction toward a second of said two edges of said housing, the other of said two brakes continuing to contact with said slide rod and the other of said two slant faces so that said slide rod is still prevented from sliding in a direction toward the first of said two edges of said housing.

2. The active control apparatus according to claim 1 further comprising another piston having two ends, which is fixedly installed in said housing at another side of the slide rod, and this an other piston is driven synchronously with said piston to extend either end thereof toward one end of said slide rod;

another two brakes, which are disposed in said housing and at said two ends of said an other piston;

another two springs, which are disposed in said housing; and another two slant faces formed inside said housing;

wherein said an other piston, said another two brakes, said another two springs and said another two slant faces are mirror symmetrical with said piston, said two brakes, said two springs and said two slant faces with respect to said slide rod.

3. The active control apparatus according to claim 1, wherein said piston is an oil pressure cylinder.

4. The active control apparatus according to claim 1, wherein said two springs are compression springs.

5. The active control apparatus according to claim 1, wherein a value of tangent functions of respective half angles between said two slant faces and said slide rod are smaller than a coefficient of sliding friction of said slide rod.

6. The active control apparatus according to claim 1, wherein both ends of said slide rod are provided with a structure adapted to couple with an outside stiffener.

7. The active control apparatus according to claim 1, wherein said housing is in the cubic form, and an outer surface of said housing is provided with a structure adapted to couple with an outside structure.

8. The active control apparatus according to claim 1, wherein said brakes are cylindrical rods, round balls or wedge-shaped blocks.

* * * * *